March 14, 1944.    R. REPPERT    2,344,412
CLOSURE FOR BATTERY BOX COVERS
Filed April 10, 1941    2 Sheets-Sheet 1
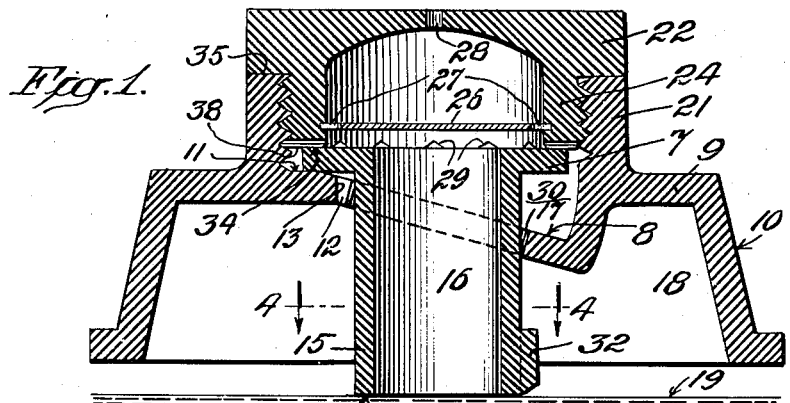
Fig.1.
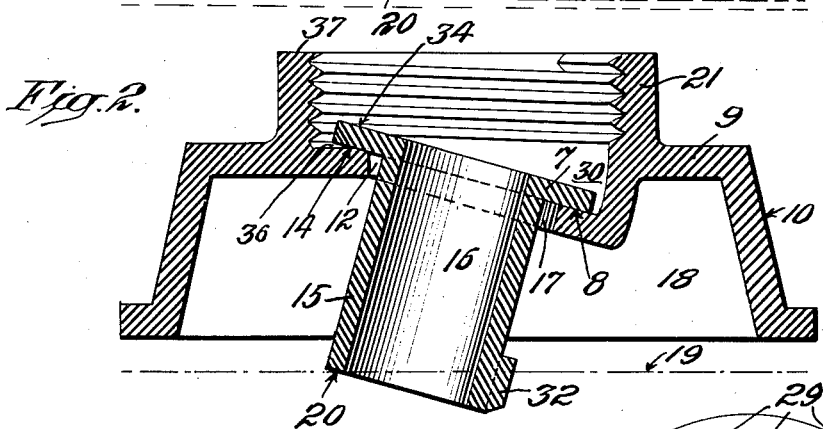
Fig.2.
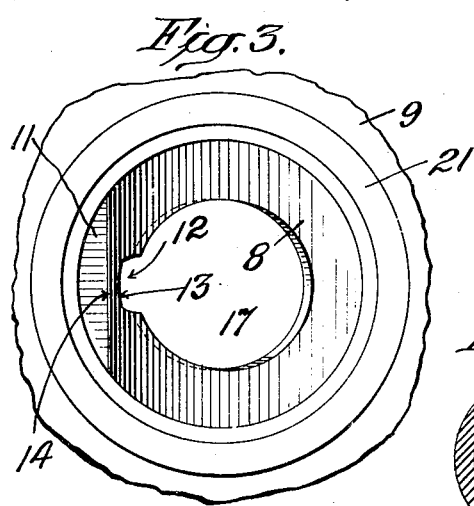
Fig.3.
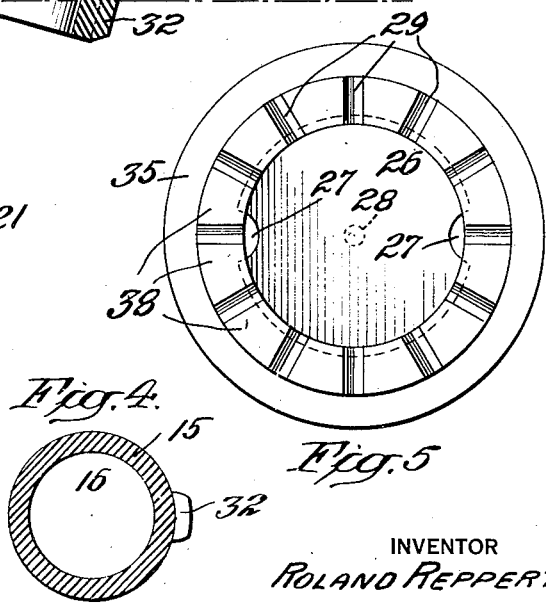
Fig.4.
Fig.5.
INVENTOR
ROLAND REPPERT
BY
English Studwell
ATTORNEYS March 14, 1944.                R. REPPERT                 2,344,412
                       CLOSURE FOR BATTERY BOX COVERS
                          Filed April 10, 1941              2 Sheets-Sheet 2
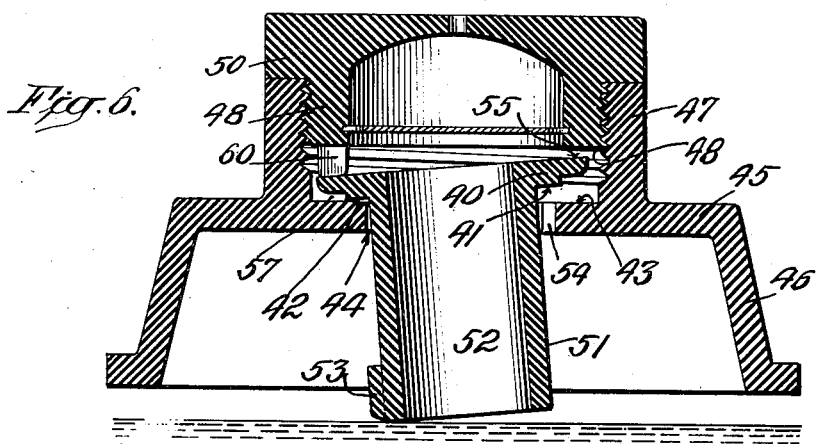
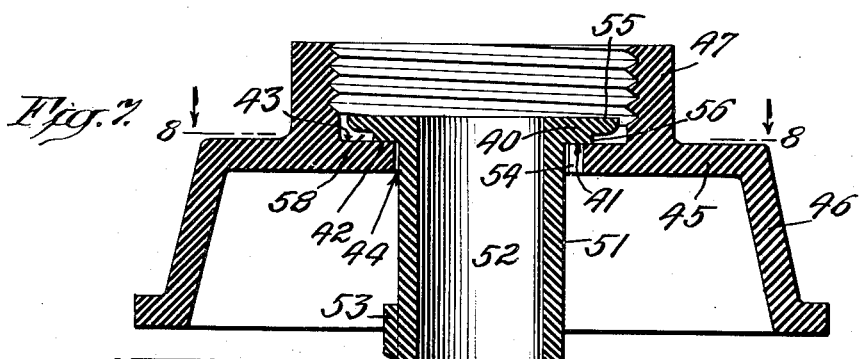
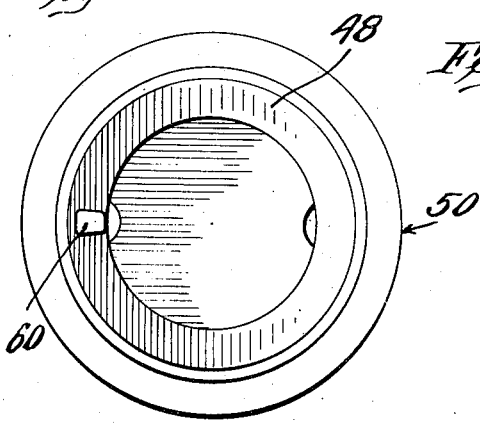
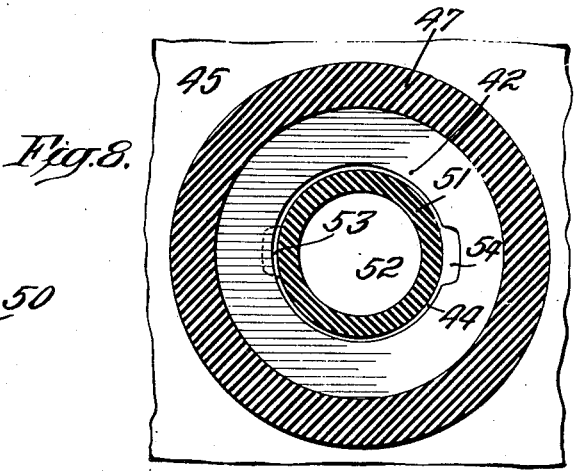
INVENTOR
ROLAND REPPERT
BY English and Studwell
ATTORNEYS Patented Mar. 14, 1944

2,344,412

UNITED STATES PATENT OFFICE 2,344,412

CLOSURE FOR BATTERY BOX COVERS

Roland Reppert, Pelham Manor, N. Y., assignor to American Hard Rubber Company, New York, N. Y., a corporation of New York Application April 10, 1941, Serial No. 387,831

2 Claims. (Cl. 136—178)

The invention relates to an improvement in closure devices for battery box covers. Such devices are so constructed that when in one condition they permit the introduction of liquid into the battery box up to a predetermined level only by preventing the escape of gases from the battery box as the liquid therein reaches a predetermined level, and when in another condition they permit the escape of gases therefrom, but prevent the introduction of liquid into the battery box. The closure device of the present invention is of the class in which a vent-controlling valve is actuated by a vent cap adapted to be screwed into the battery box cover. When the cap is in closed position on the cover the valve is moved by the cap to open or vent-uncovering position, and when the cap is removed from the cover the valve moves to closed position covering the vent.

The general object of the invention is to improve the construction of closure devices of this character so as to give assurance that the liquid introduced into the battery box can rise to a predetermined level only and that when the battery is in use, the gases formed thereby will freely escape. A more specific object of the invention is to construct the valve portion of the device in such manner that it can, when in a certain position, be readily removed from the battery box cover, whereas in all other positions it can not be removed from the battery box cover. A further object of the invention is to construct the valve with relation to the under surface of the battery box cover so that when the valve is removed from the cover and the battery box turned up-side down, all the contents of the battery box will pour out through the relatively large hole normally occupied by the valve. To the accomplishment of these ends, the invention consists in the improved battery box hereinafter fully described and particularly pointed out in the appended claims.

In the accompanying drawings illustrating the preferred form of the invention, Fig. 1 is a transverse section through a battery box cover showing the application of the improved closure device thereto, the vent cap being in closed position holding the valve so as to uncover the vent; Fig. 2 is a view similar to that of Fig. 1, but without the vent cap, thereby permitting the valve to move to vent-closing position; Fig. 3 is a top plan view of the valve seat; Fig. 4 is a transverse section taken on the line 4—4 of Fig. 1; Fig. 5 is a bottom plan view of the vent cap; Fig. 6 is a view corresponding to Fig. 1, of a modified form of the invention; Fig. 7 is a view similar to Fig. 6, but with the vent cap removed. Fig. 8 is a transverse section taken on the line 8—8 of Fig. 7; and Fig. 9 is a bottom plan view of the vent cap.

The improved closure device for battery box covers comprises an annular valve member having depending from the inner edge of its under or working surface a tube the lower end of which determines the height to which the electrolyte shall rise in the battery box. The working surface of the valve cooperates with an annular valve seat formed in the bottom of a filler well in the top wall of the battery box cover and surrounding a filler opening piercing the top wall. The valve tube is located in the filler opening and is smaller in diameter than the filler opening so that the two are separated by an annular vent space. When the valve is seated against the valve seat it closes the annular vent space so that liquid introduced into the battery box rises to only the level determined by the lower end of the valve tube. The under working surface of the valve and the valve seat have between them cooperating portions constituting a fulcrum edge upon which the valve can be tilted to uncover the annular vent space. The fulcrum edge may be located either on the working surface of the valve or on the valve seat. When the vent cap is in place on the battery box cover it engages with and tilts the valve on the fulcrum edge so as to uncover the annular vent space to permit the escape of gases formed during the operation of the battery.

The closure device embodied in the form of the invention shown in Figs. 1 to 5 comprises an annular valve member 7 the under surface of which cooperates with an inclined annular valve seat 8 formed as a part of the top wall 9 of the battery box cover, generally indicated at 10. In the uppermost point of the inclined valve seat 8 is formed a notch 12, the outer edge 13 of which terminates short of the periphery of the valve seat, indicated at 14 in Fig. 3, and which in effect constitutes a fulcrum edge on which the valve pivots or tilts to open and closed positions. Beyond the edge 14 the upper wall 9 of the battery box cover is formed as a horizontal ledge 11.

Extending downwardly from the inner edge of the annular valve 7 is a valve tube 15 having a filling opening 16 therethrough. The valve tube 15 normally occupies the filler opening 17 formed in the cover wall 9 and surrounded by the valve seat 8. When the battery box cover is in condition to permit the introduction of liquid into the battery box, the valve 7 is in the position shown in Fig. 2 entirely covering the valve seat 8 so as to prevent the escape of gas from a gas-receiving chamber 18 located between the predetermined level 19 of the electrolyte in the battery box and the under surface of the battery box cover, and surrounding the valve tube 15. In the closed position of the valve, in which the under or working surface of the valve is in contact with the inclined valve seat, the valve tube 15 has the inclined position shown in Fig. 2, and the uppermost point 20 of the under surface of the lower end of the valve tube determines the height to which the electrolyte in the battery box rises when liquid is introduced into it through the valve tube 15. In this position of the valve and tube, the under surface of the portion 34 of the margin of the valve overlaps the horizontal ledge 11, and is separated from it by a wedge-shaped opening 36.

Rising from the top wall 9 of the battery box cover substantially concentrically with the valve seat 8 is an internally threaded neck 21 which forms the filler well. A vent cap 22 provided with a hollow extension 24 is adapted to screw into the internally threaded neck 21 to engage with and move the valve 7 from the closed position shown in Fig. 2 to the open position shown in Fig. 1, by contacting with the portion 34 of the valve margin and pivoting the valve on the fulcrum edge 14.

The threaded downward extension 24 of the vent cap 22 is provided with a splash plate 26 having vent openings 27 at its opposite edges. In the top of the cap 22 is a vent hole 28. The lower edge of the tubular threaded portion 24 of the vent cap is provided with radially arranged vent grooves 29. As a result of this arrangement, when the closure device is in the condition shown in Fig. 1, with the vent cap 22 holding the valve 7 in open position, gases accumulating in the gas-receiving chamber 18 pass upwardly through the notch 12 into the opening 30 surrounding the upper end of the valve tube 15, thence through the grooves 29 into the lower end of the tubular portion of the vent cap, thence through the openings 27 and out through the vent hole 28.

It is desirable during the operation of charging the battery plates that the spent electrolyte may be emptied from the battery box in the shortest possible time. This is provided for in the device of the present invention by attaching the downwardly extending tube 15 (one point of the lower end of which determines the predetermined level of the electrolyte) to the valve 7, so that when it is necessary to empty out the spent electrolyte all the electrolyte contained in the battery box will pass out through the opening 17 normally occupied by the valve tube 15. Accordingly, when this step is necessary, the removal of the valve 7 from the battery box cover brings with it the valve tube 15, thereby leaving unimpeded the relatively large opening 17 previously occupied by the valve tube 15 for the passage of the electrolyte.

However, it is undesirable to have an arrangement by which the valve 7 may be accidentally removed from the valve opening in the battery box cover. According to the present invention removal of the valve 7 from the battery box cover, except when it is to be purposely removed, is prevented by providing the outer surface of the lower end of the valve tube 15 with a stop lug 32 which is slightly less in width and in depth than the corresponding dimensions of the notch 12 extending from the valve tube opening 17. Since the valve 7 is an annulus and the valve tube 15 is cylindrical, the valve 7 has no predetermined position of operation in the battery box cover, except a position in which the stop lug 32 will take up against the under side of the valve seat 8 when it is under normal operating conditions. Accordingly, when the valve 7 with its tube 15 is inserted through the opening 17 in the valve seat 8 by alining the stop lug 32 with the notch 12 and the lug 32 passes below the under surface of the valve seat 8, the valve 7 is turned to a position out of alinement with the notch 12, preferably to a position under the lowermost point of the valve seat 8, as shown in Figs. 1 and 2. It will thus be understood that the valve 7 cannot be removed from the battery box cover until the operator turns it to position in which the stop lug 32 is in alinement with the notch 12. Having arrived at this position the operator straightens the valve out to perpendicular position, after which the valve may be raised and the stop lug 32 pass through the notch 12.

The mode of operation of the improved closure device for battery box covers is briefly as follows: It is assumed that the battery box cover is in the condition shown in Fig. 1, which is the normal operating condition of the closure device with relation to the battery, so that the gases given off from the electrolyte will escape through the notch 12 into the opening 30, thence through the vent grooves 29, through the notches 27 and out through the vent hole 28. If now more liquid is required in the battery box, the operator removes the cap 22 from the battery box cover, whereupon the valve 7, pivoting on the fulcrum 14, and valve tube 15 will fall to the position shown in Fig. 2, with the under surface of the annular valve 7 in complete contact with the annular inclined valve seat 8, thereby preventing escape of gas from the chamber 18 when the electrolyte has reached the point 20 of the valve tube 15, during the introduction of liquid into the battery box through the opening 16 in the tube. When the operator notes that the liquid reaches the upper end of the valve tube opening 16 he knows that the liquid in the battery box has reached the predetermined level 19. He then screws the vent cap 22 into the threaded neck 21 of the battery box cover until the under surface of the annular portion 24 of the vent cap contacts with the upper surface of the marginal portion 34 of the valve 7 overlapping the horizontal ledge 11. The distance between the under surface 38 of the lower end of the annular portion 24 of the vent cap and the under surface 35 of the top part of the vent cap is such with relation to the wedge-shaped space 36 between the under surface of the overlapping margin 34 of the valve and the horizontal ledge 11 that when the under surface 35 of the head of the cap 22 contacts with the upper edge 37 of the annular neck 21, the valve 7 is raised into the horizontal position shown in Fig. 1.

When charging the plates of the battery at the plant of the manufacturer, the cap 22 is removed, the valve 7 turned until the stop lug 32 is in alinement with the notch 12, thereby permitting the valve and valve tube 15 to be straightened out and removed from the battery box cover. The battery box may then be turned upside down and all the liquid therein will escape through the relatively large opening 17 normally occupied by the valve tube 15.

The modified form of the invention shown in Figs. 6 to 9 comprises an annular valve member 40 the under or working surface 41 of which cooperates with an annular valve seat 42 formed on the inner edge of the annular horizontal ledge 43 surrounding the filler opening 44. Rising from the top wall 45 of the battery box cover 46 concentric with the filler opening 44 is an internally threaded neck 47 which receives the externally threaded tubular part 48 of the vent cap 50. Extending downwardly from the inner edge of the annular valve 40 is a valve tube 51 having a filler opening 52 extending therethrough. The filler opening 44 is slightly larger in diameter than the external diameter of the valve tube 51 so that the latter may move freely back and forth to the positions shown in Figs. 6 and 7. On the lower outside edge of the valve tube 51 is a stop lug 53 which is alined with the recess 54 cut in the valve seat 42 when the tube 51 is to be inserted in or removed from the hole 44. These parts function the same as the corresponding parts shown in Figs. 1 and 2.

In order that the valve 40 may be moved from closed position sealing the filler opening 44 and recess 54, as shown in Fig. 7, to open position uncovering the filler opening, as shown in Fig. 6, the annular valve member 40 is provided with a circumferential rim 55 of less thickness than the valve and extending radially beyond the periphery 56 of the valve proper. The under surface 57 of the valve rim 55 is spaced from the valve seat 42 when the valve is in closed position, as indicated at 58 in Fig. 7. The lower corner of the periphery 56 of the valve thus becomes a circular fulcrum edge on which the valve may be tilted to move the valve from closed to open position. The means for tilting the valve from closed to open position is a lug 60 extending downwardly from the lower end of the tubular part 48 of the vent cap 50, at a radial distance beyond the periphery 56 of the valve, so that when the lug engages with and presses downwardly on any point on the valve rim 55, the valve will be tilted, as shown in Fig. 6, thereby uncovering the annular space of the opening 44 surrounding the valve tube 51 to permit the escape of gases therethrough.

I claim:

1. In combination, a battery box cover having a threaded neck rising therefrom and surrounding a valve seat immediately outside of a filler opening, a valve member having an under sealing surface for overlying said valve seat to seal against the passage of gas through the valve and an upper surface coextensive with said valve seat and in part extending outwardly of the area of said valve seat, a tube extending downwardly from the inner edge of said valve member, said tube having an outside diameter smaller than the inside diameter of said valve seat to provide annular clearance between the tube and valve seat for venting the space under said cover when the valve member is rocked from its seat and which allows for lateral play of the valve member over its seat, a vent cap having a depending portion with threads for engaging said threaded neck and an under portion with a surface outside of and greater than the cooperating valve areas but lying within the outer rim of said valve member whereby the valve member may be rocked from its closed position on the valve seat when downward pressure is exerted on the upper surface of the rim of the valve member at a point radially beyond the sealing surface of the valve seat, and vent openings in the under portion of said depending portion to provide for the venting of gas between said under portion of the vent cap and the upper surface of said valve member when the valve member is rocked and raised from the valve seat by engagement with the under portion of said vent cap outside of the cooperating valve areas.

2. The combination of a battery box cover including a top wall having an annular valve seat on an inclined plane surrounding an opening through the wall in which is a radially projecting notch terminating short of the periphery of the valve seat and a threaded neck rising from the wall surrounding the valve seat, with a valve member consisting of an annular valve adapted in one position to seat against the valve seat and close the opening through the wall, said valve having a downwardly extending tube projecting through the opening in the wall, the wall being provided beyond the uppermost point of the inclined valve seat with a horizontal ledge which is overlapped by the outer margin of the valve, and a vent cap having a downwardly extending threaded annular part adapted to be screwed into the threaded neck of the cover and contact with that portion of the margin of the valve extending over the horizontal ledge so as to bring the under surface of the contacted margin of the valve against the horizontal ledge and thereby lift the valve from the valve seat, the lower surface of the annular portion of the vent cap being provided with radial vent grooves.

ROLAND REPPERT.